(12) United States Patent
Dierksmeier (10) Patent No.: US 10,415,403 B2
(45) Date of Patent: Sep. 17, 2019

(54) COOLED BLISK FOR GAS TURBINE ENGINE

(71) Applicant: Rolls-Royce North American Technologies Inc., Indianapolis, IN (US)

(72) Inventor: Douglas D. Dierksmeier, Franklin, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 499 days.

(21) Appl. No.: 15/405,503

(22) Filed: Jan. 13, 2017

(65) Prior Publication Data
US 2018/0230832 A1 Aug. 16, 2018

(51) Int. Cl.
*F01D 5/34* (2006.01)
*B22C 9/04* (2006.01)
(Continued)

(52) U.S. Cl.
CPC .................. *F01D 5/34* (2013.01); *B22C 9/04* (2013.01); *B22D 25/02* (2013.01); *B22D 29/001* (2013.01); *F01D 5/082* (2013.01); *F01D 5/186* (2013.01); *F01D 5/3015* (2013.01); *F05D 2220/32* (2013.01); *F05D 2230/211* (2013.01); *F05D 2240/24* (2013.01); *F05D 2240/30* (2013.01); *F05D 2260/202* (2013.01); *F05D 2300/175* (2013.01); *Y02T 50/672* (2013.01); *Y02T 50/673* (2013.01); *Y02T 50/676* (2013.01)

(58) Field of Classification Search
CPC . F01D 5/34; F01D 5/082; F01D 5/186; F01D 5/3015; B22D 29/001; B22D 25/02; B22C 9/04; Y02T 50/676; Y02T 50/673; Y02T 50/672; F05D 2240/30; F05D 2240/24; F05D 2260/202; F05D 2300/175; F05D 2220/32; F05D 2230/211
See application file for complete search history.

(56) References Cited

U.S. PATENT DOCUMENTS

| 5,244,345 A | 9/1993 | Curtis |
| 5,876,182 A | 3/1999 | Schulte |

(Continued)

FOREIGN PATENT DOCUMENTS

| DE | 103 61 882 B4 | 7/2005 |
| WO | WO 2011/054342 A1 | 5/2011 |

*Primary Examiner* — Joseph J Dallo
(74) *Attorney, Agent, or Firm* — Brinks Gilson & Lione (57) ABSTRACT

A gas turbine engine, a blisk and methods of manufacturing are disclosed. The blisk includes a disk and a plurality of blades. Each blade includes a platform, an airfoil, and a shank portion radially extending between the platform and the disk. The airfoil includes cooling features. Cooling cavities are defined between shank portions of adjacent blades and are in communication to the internal of blades via cooling feed channels. A coverplate is coupled to a downstream side of the blisk to cover the cooling cavities. A plurality of inner tabs extends from an inner edge of the coverplate to securely couple the coverplate to the disk. The disk and the plurality of blades may be integrally formed or casted as a single unit. The platform, the airfoil, and the shank portion may be formed integrally as a single unit and bonded to the disk to form the blisk.

20 Claims, 5 Drawing Sheets

(51) Int. Cl.
  *B22D 25/02* (2006.01)
  *B22D 29/00* (2006.01)
  *F01D 5/18* (2006.01)
  *F01D 5/08* (2006.01)
  *F01D 5/30* (2006.01)

(56) References Cited

U.S. PATENT DOCUMENTS

| | | | |
|---|---|---|---|
| 6,022,190 | A | 2/2000 | Schillinger |
| 6,213,714 | B1 | 4/2001 | Rhodes |
| 6,454,535 | B1 * | 9/2002 | Goshorn ................. F01D 5/022 416/193 R |
| 7,431,564 | B2 | 10/2008 | Newman |
| 8,556,576 | B2 | 10/2013 | Wilson, Jr. et al. |
| 8,992,168 | B2 | 3/2015 | Norris et al. |
| 2003/0059309 | A1 * | 3/2003 | Szucs ........................ F01D 5/20 416/228 |
| 2004/0055134 | A1 * | 3/2004 | Jones ..................... B23Q 3/063 29/464 |
| 2006/0093484 | A1 | 5/2006 | Liang |
| 2006/0277754 | A1 * | 12/2006 | Rockstroh ............... B23P 15/02 29/889.721 |
| 2007/0071608 | A1 | 3/2007 | Trewiler et al. |
| 2009/0169376 | A1 * | 7/2009 | Morgan .................. B23P 6/005 415/209.2 |
| 2010/0284817 | A1 | 11/2010 | Bamberg et al. |
| 2010/0322767 | A1 | 12/2010 | Nadvit et al. |
| 2011/0255991 | A1 | 10/2011 | Borufka et al. |
| 2013/0039760 | A1 | 2/2013 | Burt et al. |
| 2015/0204201 | A1 * | 7/2015 | Turner .................... F01D 5/143 416/179 |
| 2015/0345296 | A1 * | 12/2015 | Davidson .................. F01D 5/14 60/805 |
| 2015/0345307 | A1 * | 12/2015 | Davidson ................ F01D 5/225 60/805 |
| 2015/0345309 | A1 * | 12/2015 | Davidson ................ F01D 5/141 60/805 |
| 2015/0345310 | A1 * | 12/2015 | Davidson .................. F01D 5/28 60/805 |
| 2015/0345314 | A1 * | 12/2015 | Davidson .................. F01D 5/30 60/805 |
| 2016/0130957 | A1 | 5/2016 | Freeman et al. |
| 2016/0222806 | A1 | 8/2016 | Jennings |
| 2016/0222822 | A1 | 8/2016 | Jennings |
| 2016/0258320 | A1 | 9/2016 | Thomas et al. |
| 2016/0348517 | A1 * | 12/2016 | Kenyon .................... F01D 5/34 |
| 2018/0230831 | A1 * | 8/2018 | Kush ........................ F01D 5/34 |
| 2018/0230833 | A1 * | 8/2018 | Kush ........................ F01D 5/34 |

* cited by examiner

COOLED BLISK FOR GAS TURBINE ENGINE

TECHNICAL FIELD

The present disclosure relates generally to gas turbine engines, and more specifically to bladed disks or blisks used in sections of gas turbine engines, and methods of manufacturing the same.

BACKGROUND

At least some known turbine engines include an air intake portion, a compressor portion, a combustion portion, a turbine portion, and an exhaust portion. Such known turbine engines produce thrust and/or extract energy from a fluid flow by first compressing the intake air within the compressor portion. The compressor portion may include a series of bladed disks to form a multi-stage, axial compressor. Fuel is added to the compressed air, and the mixture is combusted in the combustion portion. The resulting hot, high-pressure gas is then expanded through the turbine portion to extract energy therefrom. The turbine portion may include a series of bladed disk assemblies (or blisks) to form a multi-stage turbine. Turbine blisks include a series of turbine blades arranged circumferentially about a rotor or disk. Blades may be secured to the rotor by the root of the blade, typically with fir tree engagement. Current turbine blisks have been expensive due to the number of components for assembly and tight tolerances. In addition, turbine blisks without suitable heat management strategies may have shorter lifecycles and limit the efficiency and power of the turbine engine. Thus, a need exists for improved turbine blisks, and methods for manufacturing the same.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Disclosed herein are examples of blisks that may be used in different sections, such as, compressor and/or turbine sections, of gas turbine engines for any industry, such as, for example, to power aircraft, watercraft, power generators, and the like. The blades of the blisks may be configured to be cooled. Cooled blades, for example, for turbines, advantageously may extend the life of the blades beyond single service life cycles. Cooled blades may allow the turbine engine to run hotter and more powerful as the blades are configured to withstand hotter gas temperature environments. Cooled blades may allow the turbine engine to run more efficiently because less air from the compressor may be required for cooling and, instead, be used for work such as combustion. The blisks may be fully casted as an integral, single unit component, for example, using an investment casting process. Alternatively, a bladed annular structure, which may be casted as an integral, single unit component, for example, using an investment casting process, may be metallurgically bonded to a rotor disk to form the blisk. The bladed portions may include integrated components such as the platform and the knife seal element. The integrated blisk structures may be less expensive to manufacture, when considering the costs and weight of attaching the blades to the disk individually with a dovetail or fir tree attachment configuration, and attaching individual knife seal supports and the aft coverplates.

Figure 1:
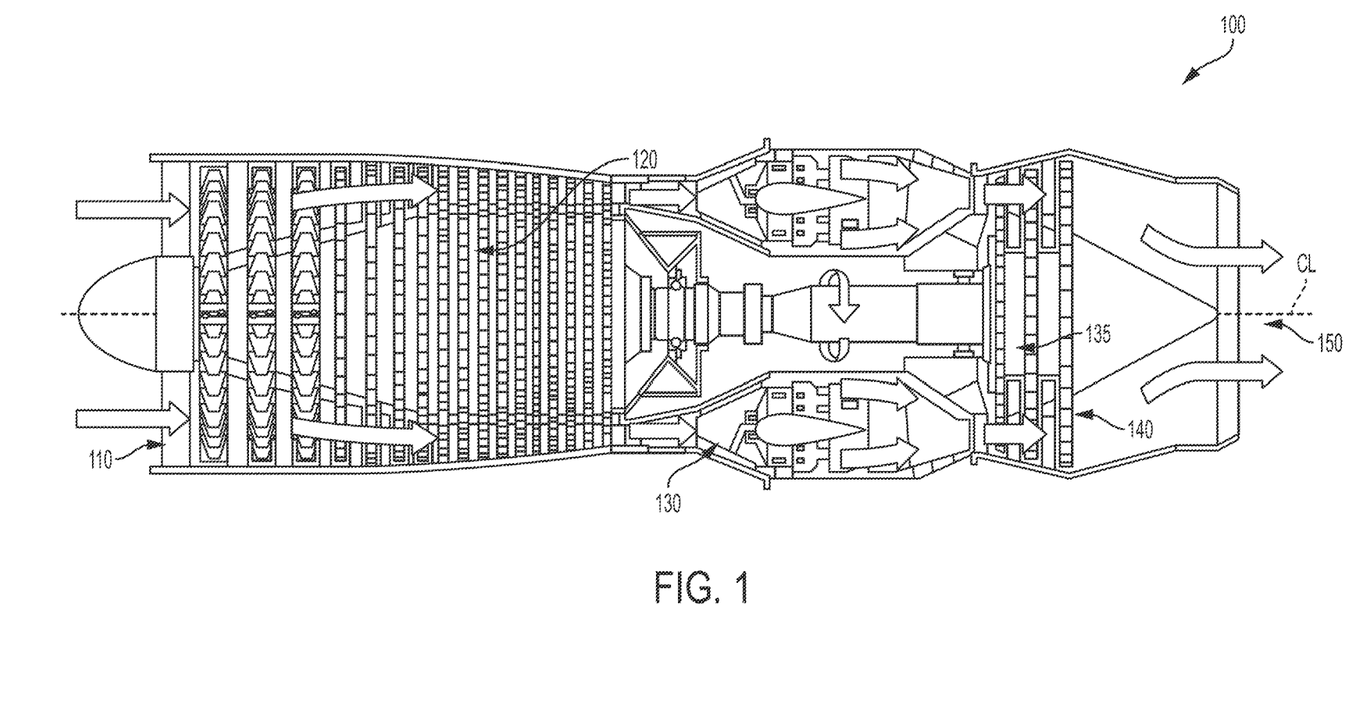
FIG. 1 depicts an example of a gas turbine engine including an example of a blisk.

FIG. 1 is a cross-sectional view of one example of a turbine engine 100. The engine 100 may include one or more of the following: an air intake portion 110, a compressor portion 120, a combustion portion 130, a turbine portion 135, and an exhaust portion 150 disposed along a longitudinal axis CL. The engine 100 may be used in any suitable application, such as, for example, to produce thrust in aircraft applications, to drive a propeller in aquatic applications, or to drive a generator in energy applications. In use, air received from the intake portion 110 may be compressed within the compressor portion 120. The compressor portion 120 includes a series of bladed disks to form a multi-stage, axial compressor. The compressed air may be then mixed with fuel and the mixture may be burned in combustion portion 130. The combustion portion 130 may include any suitable fuel injection and combustion mechanisms. The hot, high-pressure gas may be then passed through the turbine portion 135 to extract energy from the gas, which in turn drives the compressor portion 120 while discharging thrust out the exhaust portion 150.

As shown, the turbine portion 135 may include a series of turbine blisks (or bladed disk assemblies) 140. In this manner, the blisks 140 may form a multi-stage turbine. In use, the gas temperatures within the turbine portion 135 may reach temperatures at or above 2000° F., 2400° F., or higher. Moreover, certain components within the turbine portion 135, such as the flow path portion of the blisks 140 may reach temperatures of between 1600° F. and 1900° F., and higher, due to the heat transferred from the hot gas. To accommodate these temperatures, in some embodiments, the blisks 140 may include blades that include cooling passageways, as will be described.

Figure 2:
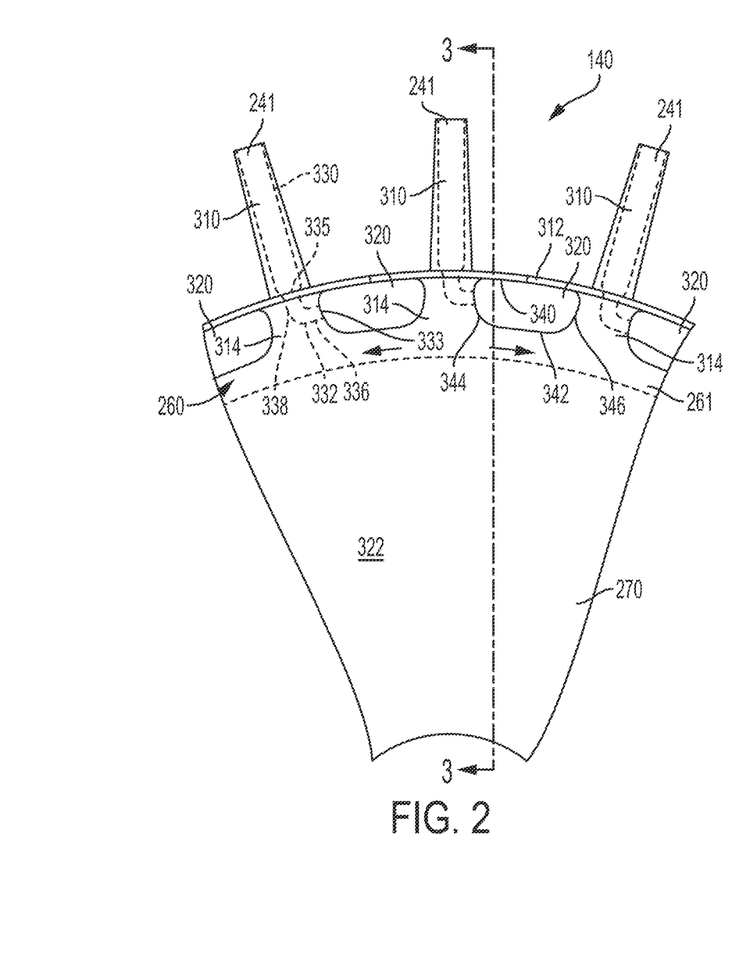
FIG. 2 is an axial downstream view of a partial segment of an example of a blisk including a disk and blade sections fully integrated into a single unit.
Figure 3:
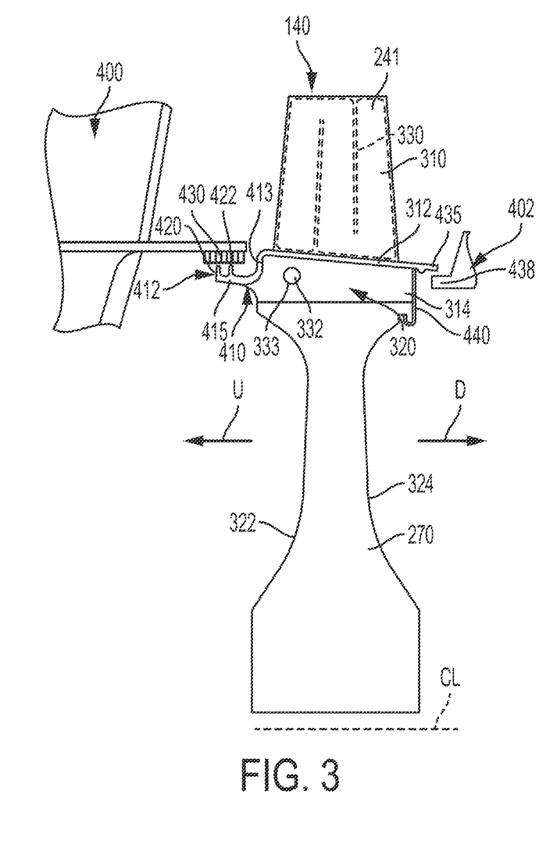
FIG. 3 is sectional view of the blisk taken along line 3-3 in FIG. 2.

FIG. 2 illustrates a circumferential segment of the blisk 140 included within the engine 100 or any other suitable turbomachinery. FIG. 3 depicts a sectional view of the blisk 140 taken along line 3-3 in FIG. 2. The blisk 140 includes one or more of the following: a plurality of blades 241 forming a blade annular element 260 and a rotor disk 270, which is in a coaxial relationship with the blade annular element 260. The blade annular element 260 may include a ring element 261 disposed radially inward from the blades. In one example, the blade annular element 260 and the disk 270 are an integrated unit. The blade annular assembly 260 is shown including an outer surface that may be a continuous, circumferential surface. The blades 241 may be spaced circumferentially around the blade annular assembly 260 and the disk 270 and extend radially outward from the longitudinal axis CL of the engine 100. The number of blades 241 may depend on the application of the blisk 140, for example, whether the blisk 140 is a high pressure, intermediate pressure, or low pressure stage, and what type of engine the blisk 140 belongs to.

The blades 241 may include an airfoil 310 extending radially outward from a platform 312 relative to the longitudinal axis CL, and a shank portion 314 extending below the platform. The shank portion 314 may radially extend between the platform 312 and the disk 270. A cooling cavity 320 is defined in a first face 322 of the blisk 140 between the shank portions 314 of blades 241 that are disposed adjacent to one another. The first face 322 may be referred to as the upstream or high pressure side of the blisk 140 and may also be used to reference the upstream side of the disk. A second face 324 obverse to the first face 322 may be referred to as the downstream or low pressure side of the blisk 140 and may also be used to reference the downstream side of the disk. To this end, the arrow U pointing away from the first face 322 is pointed in an upstream direction, and the arrow D pointing away from the second face 324 is pointed in a downstream direction. As shown, a plurality of cavities 320 is disposed in an annular pattern along the blisk 140. As will described, the cooling cavities 320 are configured to receive cooling air flow from the compressor section for cooling of the shank portion, the platform, and the airfoil.

The airfoil 310 may include an internal cooling flow passage 330 (shown in dashed lines) defined therein. A cooling feed channel 332 (also shown in dashed lines) is defined within the shank portion 314. The cooling feed channel 332 extends between, and in fluid communication with, to interconnect the cooling cavity 320 with the internal cooling flow passage 330. The cooling feed channel 332 includes an upstream end 333 terminating at the outlet of the cooling cavity 320 and a downstream end 335 terminating at the inlet of the internal cooling flow passage 330. In one example, the cooling feed channel 332 includes a circumferential portion 336 extending within the shank portion 314 from the upstream end 333, a radial portion 338 extending to the downstream end 335, and a radial transition 339 interconnecting the circumferential portion 336 and the radial portion 338, as shown in FIG. 4.

The airfoil 310 may have a single wall configuration with an internal airfoil cavity forming an aspect of the internal cooling flow passage 330 and a series of discharge or outlet ports formed in the airfoil wall where cooling air leaves the internal airfoil cavity for film cooling of the airfoil outer surface. The airfoil 310 may have a dual wall spar configuration with an internal spar cavity forming an aspect of the internal cooling flow passage 330. A shell or panel(s) is metallurgically bonded to standoffs formed in the outer surface of the spar. The standoffs may be elongated structures to form grooves or channels and/or pedestals or pins. A series of discharge or outlet ports may be provided in the panel(s) for film cooling when the cooling air exits the grooves. Impingement inlet cooling ports are formed within the grooves spaces of the spar in which the cooling air leaves the internal spar cavity and enters the grooves after impingement against the panel. The airfoil 310 may include a single wall spar configuration, having a spar with external standoffs and/or protrusions formed in the outer surface of the spar, and a cover panel attached to the spar such that the spacings between the standoffs and/or protrusions define an aspect of the internal cooling flow passage 330. Cooling air provided in the spacings provide cooling of the spar and the cover panel and a series of discharge or outlet ports may be defined by the cover panel to allow cooling air to leave the spacings for film cooling of the airfoil outer surface. The grooves or channels may form an aspect of the internal cooling flow passages of any of the airfoil configurations, and may have a variety of patterns, such as, for example, a serpentine, or 's', shape, with a series of radial passages, joined by bends, directing the internal blade cooling flow alternately radially inwardly and radially outwardly.

Figure 4:
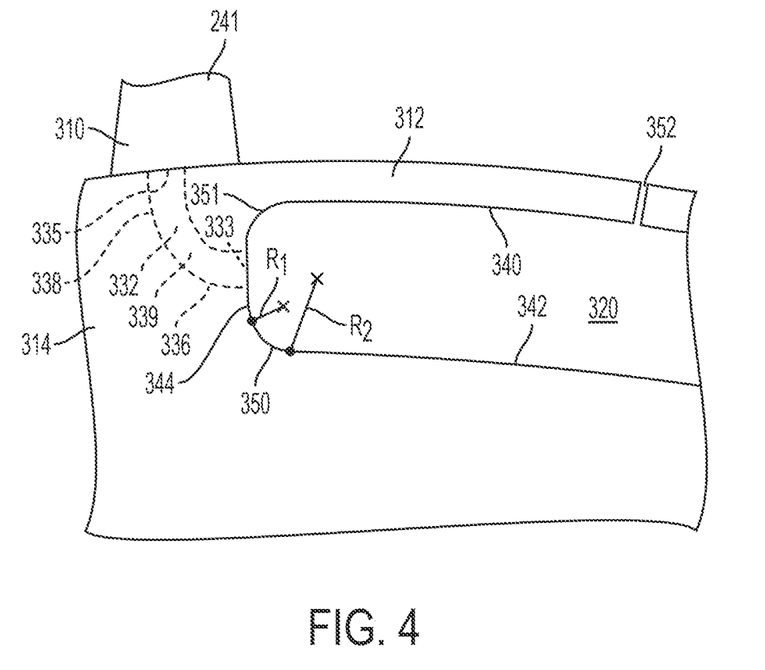
FIG. 4 is a partial detailed view of cooling cavity of the blisk of FIG. 1.

FIG. 4 depicts a detail of the cooling cavity 320. The cooling cavity 320 and the cooling feed channel 332 may be further arranged to reduce potential stress risers within the blisk. For example, a circumferentially extending outer wall 340 defining the cooling cavity 320 is shown to be formed by the radially inner surface of the platform 312, and a circumferentially extending inner wall 342 defining the cooling cavity 320 is shown radially offset from the outer wall 340, and may further form coaxial relationship. A pair of radially extending lateral walls 344, 346 defining the cooling cavity 320 may be formed by the outer surfaces of adjacent shank portions 314, which interconnect with the outer wall 340 and the inner wall 342 together to form the cooling cavity 320. Each of the lateral walls 344, 346 may extend parallel to a plane P extending through the longitudinal centerline CL. The ring segment 261 is shown radially inward from the cooling cavities 320 to define the blade annular assembly 260, as shown in FIG. 2.

The intersection of the lateral walls 344, 346 and the inner wall 342 may form a radial transition or corner 350. The radial corner 350 may be defined having a first radius R1 extending from the lateral wall 344, for example, and a second radius R2 extending between the first radius R1 and the inner wall 342. The first radius R1 is sized for the suitable radial stress factors (Kr). The second radius R2 is sized for the suitable hoop stress factor (Kt). The first radius R1 may be less than the second radius R2. The intersection of the lateral walls 344, 346 and the outer wall 340 may form a radial transition or corner 351. Placement of the upstream end 333 of the cooling feed channel 332 may be disposed in a portion of the lateral wall 344 above or radially outside the beginning of the first radius R1 of the radial corner 350 and below or radially inside of the beginning of the radial corner 351. Similar corner features may be included at the opposite end of the cooling cavity 320 not shown in FIG. 4.

The platforms 312 in FIG. 4 are also shown as discontinuous or having a slot 352 formed in an intermediate region between adjacent blades 241. The platforms 312 with slots 352 may allow for thermal expansion and contraction to occur in order to avoid thermal stresses that lead to potential cracking in the platforms. The dimensions of the platforms 312 in the circumferential direction may be sufficient that adjacent platform edges abut one another. In some examples, the platform edges in the abutment relationship may be joined permanently such as by welding or brazing.

FIG. 3 depicts the relative arrangement of the blisk 140 and adjacent upstream and downstream vane structures 400, 402, such as in a turbine section. Extending longitudinally upstream from the platform 312 beyond the shank portion 314 and the airfoil is a seal support 410 and a seal element 412. The seal support 410 may include a radial inward extension 413 and a longitudinal extension 415 extending upstream from the radial inward extension 413. The radial inward extension 413 may define an upstream faceplate of the shank portion 314 and further shield the shank portion 314 from the hot gas path. The radial inward extension 413 may form an annular shape, which may be a continuous annulus without any breaks or a discontinuous annulus with one or more breaks. The longitudinal extension 415 is shown as radially inward offset from the general position of the platform 312. The longitudinal extension 415 of the seal support 410 may form a circumferential rim, which may be a continuous rim without any breaks or a discontinuous rim with one or more breaks. In one example, the platforms 312 together with the seal support 410 may form a complete annulus shielding the disk from the temperature of the main gas path and directing the hot gas downstream for exhaust.

The seal element 412 may be in the form of a knife edge seal or other sealing mechanism. In one example, a first radially extending knife edge seal 420 and a second radially extending knife edge seal 422 extends from the radially outer surface of the longitudinal extension 415 of the seal support 410. The first knife edge seal 420 may be parallel to the second knife edge seal 422 but may be angled relative to the axis of rotation to control airflow. In one example, the first knife edge seal 420 may extend radially longer than the second knife edge seal 422. The knife edge seals 420, 422 are shown engaging with a vane seal assembly 430 of the upstream vane structure 400. In one example, the vane seal assembly 430 is an annular honeycomb structure into which the knife edge seals 420, 422. The annular honeycomb structure may provide an indirect air seal path as well as an abradable interface surface within which the knife edge seals 420, 422 sealably engage. In one example, the sealed arrangement provided between the seal element 412 and the vane seal assembly 430 may further inhibit leakage of the hot gas from mixing with the cooling air or the loss of cooling air to the hot gas path, making the disk and internal blades susceptible undesirably to hotter temperatures. Accordingly, the sealed arrangement is operable to allow for the effective passage of cooling air across the face of the disk and internal to the blade for convection cooling, thereby reducing its operating temperature.

Extending longitudinally downstream from the platform 312 beyond the shank portion 314 and the airfoil is a downstream rim 435 in the form of circumferential rim, which may be a continuous rim without any breaks or a discontinuous rim with one or more breaks. The downstream rim 435 may form a complete annulus shielding the disk from the temperature of the main gas path and directing the hot gas downstream for exhaust. The downstream vane structure 402 may include an upstream lip 438 overlapping the inner surface of the downstream rim 435. Seal elements, such as the honeycomb seal and knife edge seal arrangement, may be included for sealing this region.

The cooling cavity 320 is shown extending from the first face 322 through the second face 324 of the blisk 140. The upstream end 333 of the cooling feed channel 332 may be located along any portion of the lateral wall 344. FIG. 3 shows the location of the upstream end 333 being located closer to the first face 322 than the second face 324. Alternatively, more than one upstream end 333 and corresponding cooling feed channels may be included to provide more than one inlet into the internal cooling flow passage 330. The cross-sectional shape of the upstream end 333 of the cooling feed channel 332 may be round or elliptical or otherwise shaped to reduce flow losses.

Figure 5:
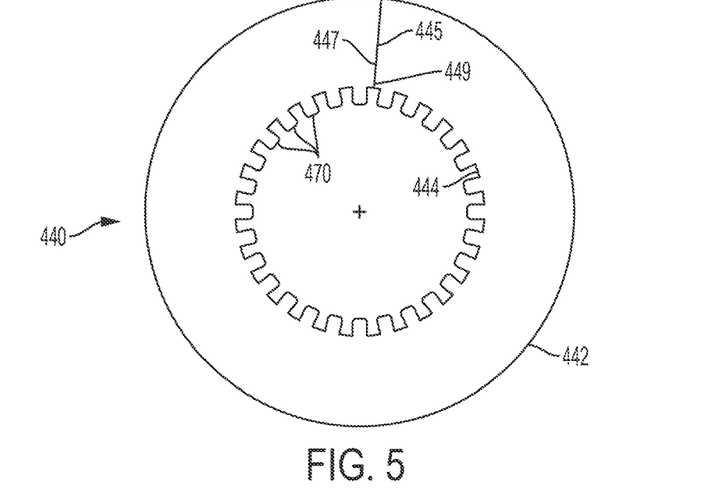
FIG. 5 depicts a coverplate provided with the blisk in FIGS. 2-3.

In FIG. 3, a coverplate 440 is securely coupled along the second face 324 or downstream side of the blisk 140. As shown in FIG. 5, the coverplate 440 may be configured as an annular structure, including a circumferential arcuate segment radially extending between an outer edge 442 and an inner edge 444. The distance between the outer edge 442 and the inner edge 444 is sized to be greater than the distance between the outer wall 340 and the inner wall 342 of the cooling cavities 320. In this manner, the coverplate 440 covers or overlaps the downstream end of the cooling cavities 320 to physically block the cooling air from exiting the cooling cavities 320 and instead direct the cooling air to the upstream end 333 of the cooling feed channel 332. The coverplate 440 may be a single annular structure. In one example, the coverplate 440 may include a slot 445 formed in the single annular structure. The slot 445 may allow the slot defining edges 447, 449 of the coverplate 440 that define the slot 445 to overlap one another during installation. The overlapping configuration of the coverplate 440 makes the cross-sectional area of the coverplate smaller for insertion into a circumferential groove defined by a radial inward flange 450, as will be described. In another example, the coverplate 440 may comprise of a plurality of plate segments provided to extend around the entire circumference of the stage, between the circumferential groove formed in the platforms and the circumferential groove formed in the disk, as will be described. The plate segments may extend through any suitable circumferential extent. For example, each plate segment may circumferentially extend to correspond to 1, 2, 3, 4, 5, 6, 7, 8, 9, 10, or more the number of blades. Adjacent edges of the plate segments may be welded or brazed.

Figure 6:
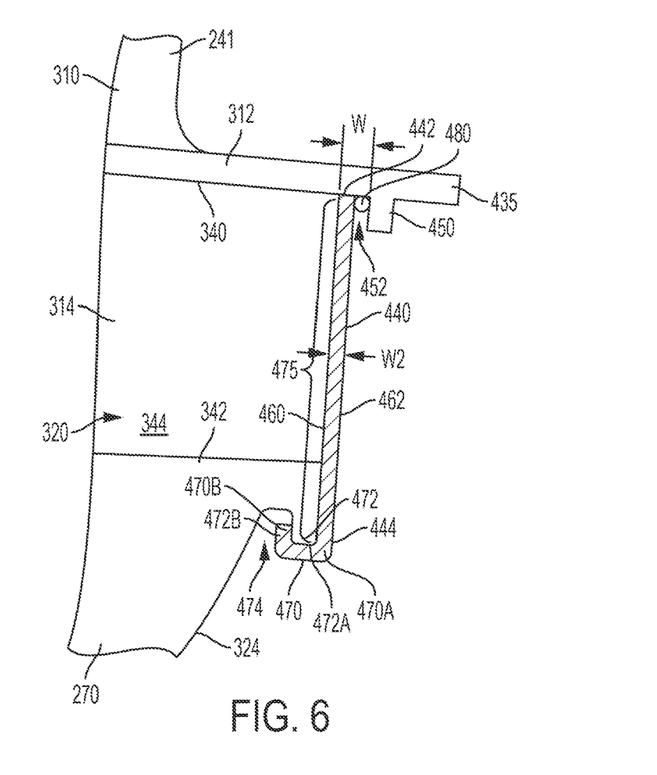
FIG. 6 is a partial detailed view of the mounting of the coverplate to the blisk.

With additional reference to FIG. 6, the radial inward flange 450 is extended from the inner surface of the rim 435 of the platform 312 and longitudinally offset downstream from the second face 324 to define a first circumferential groove 452 having a longitudinal width W. The longitudinal width W2 of the outer edge of the coverplate 440 is measured between upstream and downstream facing surfaces 460, 462 of the coverplate 440. The outer edge 442 of the coverplate 440 is sized to be received within the circumferential groove 452. In one example, the longitudinal width W is sized at least twice the longitudinal width W2 of the radial inward flange to accommodate the example of the overlapping configuration of the coverplate 440 during installation. A plurality of radially inner tabs 470 extends radially inward from the inner edge 444. The inner tabs 470 are circumferentially spaced from another in an annular pattern and each tab 470 may be associated with one of the blade.

A radial inward lip 472 is defined by the body of the disk and longitudinally offset downstream from the second face of the disk to define a second circumferential groove 474. The radial inward lip 472 is disposed upstream from the location of the radial inward flange 450 and closer to the longitudinal axis than the radial inward flange 450. In one example, the engagement portion 475 of the second face or downstream side of the shank portions and/or disk defines a planar surface to which the upstream facing surface 460 of the coverplate 440, which is shown to be planar, engages to minimize potential leakage paths. The distance between the outer edge 442 and the inner edge 444 is sized to cover the engagement portion 475 such that the inner tabs 470 may be formed around the radial inward lip 472. For example, the inner tabs 470 may have an initial non-bent configuration, as shown in FIG. 5, and may be bent or folded into a bent configuration, as shown in FIG. 6, around and/or along the radial inward lip 472, such as by a machine press, such that a body portion 470A of the inner tabs 470 is engageable with a radially inward facing surface 472A of the radial inward lip 472. In another example, the inner tabs 470 in the bent configuration may by bent or folded around the radial inward lip 472, such as by a machine press, such that a tip portion 470B of the tabs is engageable with an axially facing surface 472B of the radial inward lip 472 and inserted within the circumferential groove 474. The body and tip portions 470A, 470B may be further fixed by welding or brazing. The engagements between the portions 470A, 470B may provide further structural retainment of the coverplate to the disk and prevent or limit relative axial movement during rotational operation as well axis axial forces created by the gas pressures.

A support locking element 480 may be disposed within the circumferential groove 452 and in engagement with the downstream facing surface 462 of the coverplate 440 and the axially facing surface of the radial inward flange 450. In one example, the support locking element 480 is an elongate member or wire made of a metal or composite. The cross-sectional size of the support locking element 480 is sized to fill the difference between widths of the longitudinal widths W and W2. The support locking element 480 may provide pressure in the upstream direction along the downstream facing surface 462 of the coverplate 440 to maintain engagement with the engagement portion 475 of the disk and to prevent or limit relative axial movement between the coverplate and the disk. The length of the support locking element 480 is determined based on the circumferential length of the circumference groove 452, and the support locking element 480 is cut to size, whether as a single unit or a series of units that equal the desired length. After the coverplate is positioned within the circumferential grooves, the support locking element 480 is pressed in with suitable mechanical force such that the support locking element 480 travels along the confronting surfaces of the coverplate 440 and the radial inward flange 450 until the support locking element 480 bottoms out along the end of the circumferential groove 452. The coverplate attachment may be beneficial when the cooling cavity formed is a through opening. In another example, the cooling cavity may be formed such that an internal wall is formed and the coverplate 440 is omitted.

Figure 7:
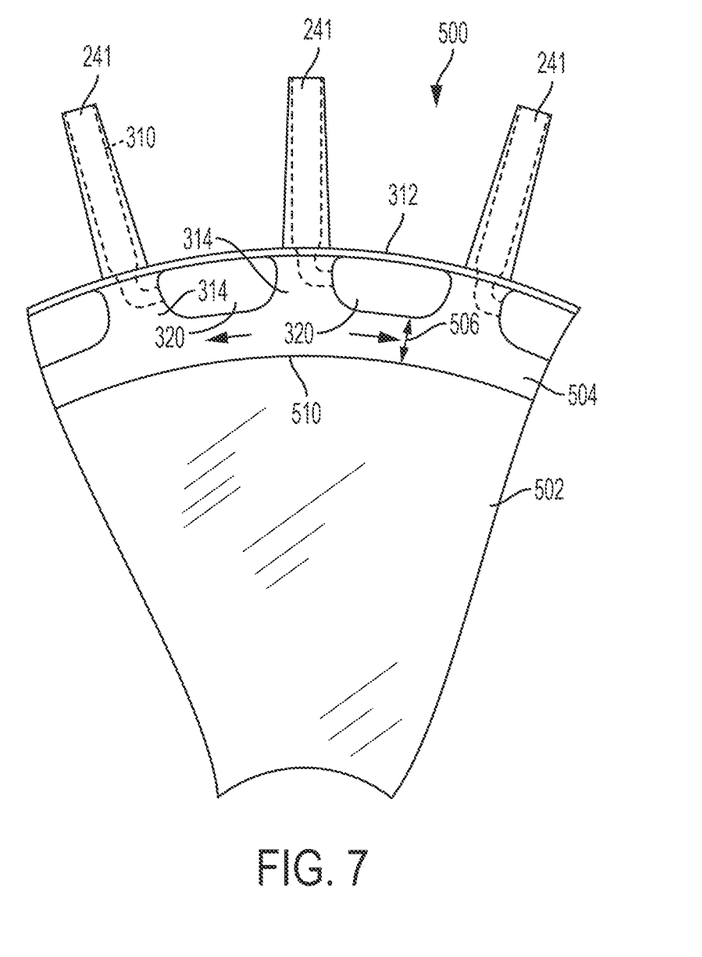
FIG. 7 is an axial downstream view of a partial segment of an example of a blisk, including a disk section bonded to a blade section.

In one example, the blisk may be formed integrally into a single structure, such as the blisk 140 shown in FIGS. 2-3. In another example, the blisk may be formed by two components, such as the blisk 500 including the disk 502 metallurgically bonded to an annular bladed segment 504, as shown in FIG. 7. In either example, the blisk 140, the disk 502 and/or the annular bladed segment 504, may be formed integrally, for example, by an investment casting process, or from machining from solid, or are formed separately and then permanently joined together, for example by brazing, diffusion bonding, inertia or friction welding. In this way, the blades are attached to the disk, in particular so as to resist detaching from the disk in a radial direction as a result of centripetal loading during rotation.

In one example, the blades 241 and the disk 270 may be casted or machined together into a single unit. The blades 241 may include the airfoil 310 upstanding from the platform 312, the shank portion 314 extending below the platform 312, the radial inward flange 450, the radial inward lip 472 with corresponding grooves 452, 474, the cooling cavities 320, the seal support 410, and the seal element 412.

In one example, the blades 241 may be casted or machined with the airfoil 310 upstanding from the platform 312 and the shank portion 314 extending below the platform 312. The radial inward flange 450 and the radial inward lip 472 with corresponding grooves 452, 474, the cooling cavities 320, the seal support 410 and the seal element 412 may also be casted or machined along with the platform 312. These features may be formed together to define the annular bladed segment 504 that includes a ring segment 506 which may be a constant radial depth along the circumferential length at some distance below the cooling cavities 320, as shown in FIG. 7. The inner surface of the ring segment 506 may be bonded by brazing, diffusion bonding, inertia or friction welding to an outer surface of the disk 502 to define a bond line 510. In this matter, the disk may be formed from a different material and/or processes, such as by forging, having more suitable properties than the annular bladed segment 504. To this end, the blades may be formed separately from the disc, preferably by casting, although other methods are not excluded.

In one example, any one of the disclosed blisks and blisk components may be formed of a heat resistant superalloy composition, a ceramic material, such as a ceramic-matrix composite (CMC) material, or other materials used for components. There are various types of superalloy compositions, such as but not limited to nickel based or cobalt based compositions, and the manufacturers of such compositions are generally known to those skilled in the art. Most superalloy compositions of interest are complicated mixtures of nickel, chromium, aluminum and other select elements. Any one of the disclosed blisks may be of a unitary cast configuration, and/or an assembly of cast components, and/or an assembly of cast and wrought components. Any one of the disclosed blisks may have an equiax, directionally solidified or a single crystal alloy structure. In one example, the blisk may be casted of a single crystal single structure. Further, in alternate examples, any one of the disclosed blisks and blisk components may be formed of a metallic material, or an intermetallic material or a ceramic material. As mentioned above, the materials used for these blisk components need not be the same. For example, the annular blade segment may be cast from a nickel alloy, such as, for example, MAR-M-002 or MAR-M-234, while a nickel alloy powder known as UDIMET 720 may be used to form the disk.

The cooling cavities, channels, passages, outlet and inlet ports may be formed from the use of ceramic inserts used during casting. In casting the blades, the internal cooling passages may be created by the use of ceramic cores (not shown) which may be subsequently leached out leaving the internal passages and cavities. In one example, the airfoil wall and the spar of the airfoil of the blade may be integrally formed as a unitary component through a casting or 3-D printing process, for example. In another example, the spar may be formed through a casting process to form standoffs in the desired pattern of pedestals, elongate columns and/or pins that line the boundaries of grooves or channels. In other examples, the spar may be machined via mechanical milling or pulse electrochemical machining (ECM) to form the standoffs in the desired pattern of pedestals, elongate columns and/or pins and the grooves or channels. The spar after processing may be configured to receive a cover panel. In another example, a spar and a cover panel that is placed over the spar may be integrally formed with one another, with standoffs walls and the grooves or channels formed between the spar and the cover panel.

In one example, a method of manufacturing the blisk 140 or 500, including one or more of the following steps or any combination thereof with an investment casting process. The casted cool blisk may include cooled airfoils 310 of blades 241 casted integrally with the disk 270 or cooled airfoils 310 of blades 241 casted integrally for attachment to the disk 270. The airfoil cooling circuit formed by the internal cooling flow passages 330, including the internal spar cavity and/or grooves, may be formed by placing ceramic cores into a rotor wax pattern before being shelled and casted. The airfoil internal cavity aspect of the internal cooling flow passages 330 may be formed by a ceramic core may held in position by ceramic core printouts or pins at the cooling air entry ports and outlet ports, as needed, in the trailing edge and tips. Small local protrusions may be formed on the ceramic core to keep the core from shifting during the pour and for controlling the wall thickness of the airfoil.

For example, ceramic structures including one or more sacrificial ceramic cores having any of the features described herein are provided. The ceramic cores may be shaped to correspond with the desired pattern of internal cooling flow passages 330. The ceramic structure having the one or more sacrificial ceramic cores may be inserted into a casting mold. Particularly, the ceramic structure defined at least in part by the one or more sacrificial ceramic core may be positioned within two joined halves of a metal casting mold. The casting mold defines an injection volume that corresponds to the desired shape of the airfoil of the blade and/or the disk of the blisk, including platforms, seal elements, cooling cavities and feed channels, axial rims and radial lips and flanges. Other ceramic structures may be used to define the cooling feed channel 332 within the shank portions and coupled to the ceramic core for defining a non-obstructed cooling air passage into the airfoil.

Melted wax may be vacuum injected into a wax mold around the ceramic structure. After the wax hardens, the wax mold halves are separated and removed to reveal the ceramic structure encased inside a wax pattern that corresponds to the desired shape of the final cast alloy representing the airfoil 310 of the blade 241 and/or disk of the blisk 140. The wax pattern's outer surface may be then coated with a ceramic material, such as, for example, by a dipping process in a ceramic slurry, to form the ceramic shell around the ceramic structure and the wax pattern unit. Once the ceramic shell cures, the wax may be removed by high temperatures, such as an oven. Particularly, upon curing of the ceramic shell and removal of the wax such as by an oven, a completed ceramic casting mold is available to receive molten alloy in the investment casting process. A component material in the form of a molten metal alloy is introduced into the casting mold. The ceramic structure including the one or more sacrificial ceramic cores is removed after the component material has solidified. Particularly, after the molten metal alloy has solidified, the ceramic structure, including the sacrificial ceramic cores is removed by mechanical and/or chemical means to reveal the component as a final cast alloy.

The final cast alloy may be close to final form shape, either as the full blisk 140 or the annular bladed segment 504. The final cast alloy may then be machined, such as by drilling, laser cutting, wire EDM (electric discharge machining), grinding and/or polishing. For example, the cooling cavities 320 may be formed by the removal of the sections corresponding to the locations of the cavities. If already casted, the cooling cavities may be polished or machined to specifications. The final shape of the platform 312 and/or the seal support 410 may be formed. The seal element 412, such as the knife edge seals 420, 422, may be machined into the upstream section of the seal support of the platforms 312. The slots 352 may be machined into the platforms 312, as shown, to define a discontinuous platform. One or more outlet ports may be machined with, for example, by drilling or laser cutting, in the final cast alloy component such that the machined ports in the airfoil 310 are in fluid communication with the internal cooling flow passages 330. When the blisk is the blisk 140 shown in FIGS. 2-3, a shaft bore may be further formed into the center of the disk. When the blisk is formed by two components, such as the blisk 500 shown in FIG. 7, the annular bladed segment 504 after being casted may be permanently joined together, for example by brazing, diffusion bonding, inertia or friction welding, to the disk 502. A shaft bore may be further formed into the center of the disk 502.

The coverplate 440 may be mounted to the blisk. For example, when the coverplate is a single annular structure with the slot, the coverplate may be placed in the overlapping configuration for clearance of the radial inward flange 450 and for insertion into the circumferential groove 452. The coverplate may then resiliently move to its annular, non-overlapping configuration within the circumferential groove 452. The inner tabs 470 may be placed in its bent configuration by a mechanical force, such as a press, to wrap around the radial lip 472 such that the tip portion 470B is inserted within the circumferential groove 470. If the coverplate is in sections, each of the sections may be placed as described. After the coverplate 440 is positioned, the support locking element 480 is inserted within the circumferential groove 452 with a suitable mechanical force until the support locking element 480 bottoms out along the end of the circumferential groove 452.

Cooling air used for cooling turbine components may be supplied from any suitable source. For example, the cooling air may be bled internally from one or more of the compressors, such as, for example, an intermediate pressure compressor and/or a high pressure compressor of the compressor portion. Cooling air comes from fluid passages from the compressor portion, around the combustion portion and into the turbine portion. The platforms may form a shield to protect the disk from the temperature of the main gas path and directing the hot gas downstream for exhaust, and to prevent leakage of cooling air into the hot gas path.

As described above, the blisk 140 or 500 is configured to allow cooling air to enter the internal cooling flow passages within the blades through the cooling feed channels in the blade shank portions, under the platforms. Before entering the cooling feed channels, the cooling air path may be arranged to draw the air across the first face of the disk of the blisk thereby cooling the disk portion of the blisk. Cooling air enters the cooling cavities from the first face of the blisk and directed to the cooling feed channels. The downstream end of the cooling cavities may be blocked by the upstream facing surface of the installed coverplate. This means that substantially all of the cooling air (with industry acceptable leakage considered by one of ordinary skill in the art) enters the cooling cavities is fed into the cooling feed channels, and subsequently through the internal cooling flow passages. In one example, substantially none of the cooling air that enters the cooling cavities passes through to the downstream side of the blisk.

At least a portion of the cooling air may be directed into the internal cooling flow passages within the airfoil to provide cooling, for example, effusion cooling. The cooling air passing into the cooling cavities experiences a centripetal acceleration due to the rotation of the blisk. In turn, the cooling air moves through the cooling feed channels of the shank portion in the radially outward direction. The internal cooling flow passages may have any suitable shape. FIG. 3 depicts the internal cooling flow passages including three internal blade cavities. Cooling air may exit the internal blade cavities through outlet ports and along the outside surface of the airfoil for film cooling. Cooling air may exit the internal blade cavities through inlet ports into internal grooves or channels formed in the outside surface of the spar prior to exiting the airfoil for film cooling through outlet ports.

The internal cooling flow passages that run below the airfoil surface to transport cooling air to one or more film outlet ports. The inlet portions may be configured and positioned for impingement cooling along the length of the internal cooling flow passages. The film outlet ports or slot may be configured to reduce the aerodynamic penalty and further reduce surface temperatures. Embedding the channels below the airfoil surface allows for higher cooling effectiveness. Coolant air enters the cooling channel and flows along the smooth surface.

Improvement in temperature limitations of the blisk and blades with cooling features may allow less cooling air flow from compressor to be used. Less air flow may result in such saved air being used in the combustor, therefore promoting the capture of better fuel economy for the gas turbine engine. Improvements in temperature limitations of the blisk assembly and blade section may allow the turbine gas engines to operate hotter and with additional power. The blisk assembly configurations may provide an inexpensive option and/or reduced weight for a turbine section. For example, an integrated blade and disk from a casting process, with the blade cooling features.

In some instances, the term "disk" may be defined generally as referring to any structure extending from the inner edge of the disk to the platform. In this regard, the term "disk" may encompass the structure defined as the shank portion, which, in some examples, may be preferred when the structure is casted and difficult to distinguish the components.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

Furthermore, the advantages described above are not necessarily the only advantages, and it is not necessarily expected that all of the described advantages will be achieved with every embodiment.

The subject-matter of the disclosure may also relate, among others, to the following aspects:

1. A blisk for a gas turbine engine, the blisk comprising: a disk disposed about an axis, the disk having an upstream side and a downstream side; a plurality of blades, each blade comprising a platform, a cooled airfoil extending radially outward from the platform relative to the axis, and a shank portion extending between the platform and the disk, the disk having a cooling cavity being defined therein between the shank portions of the blades that are adjacent to one another, the cooling cavity in fluid communication with the cooled airfoil, wherein a radial lip extends inward relative to the axis from the downstream side of the disk, the cooling cavity configured to receive cooling air provided upstream of the blisk; and a coverplate disposed over the cooling cavity, the coverplate including an inner tab extending radially inward from an inner edge of the coverplate, wherein the inner tab is coupled to the radial lip to securely couple the coverplate to the disk.

2. The blisk of aspect 1, wherein the coverplate defines an annular shape.

3. The blisk of any of aspects 1-2, wherein the coverplate is a discontinuous element.

4. The blisk of any of aspects 1-3, wherein the inner tab is engaging at least two sides of the radial lip.

5. The blisk of any of aspects 1-4, wherein the radial lip is longitudinally offset downstream from the disk to define a circumferential groove, and the inner tab includes a tip extending within the circumferential groove.

6. The blisk of any of aspects 1-5, wherein the inner tab is in a bent configuration.

7. The blisk of any of aspects 1-6, wherein a radial flange extends inward from the platform, and is longitudinally offset downstream from the shank portion or disk to define a circumferential groove sized to receive an outer edge of the coverplate.

8. The blisk of any of aspects 1-7, wherein a longitudinal width of the circumferential groove is greater than a longitudinal width of the coverplate.

9. The blisk of any of aspects 1-8, further comprising a support locking element disposed within the circumferential groove and in engagement with the coverplate and the radial flange.

10. The blisk of any of aspects 1-9, wherein the disk and the plurality of blades are formed integrally as a single unit.

11. The blisk of any of aspects 1-9, wherein the plurality of blades are formed integrally as a single unit to define an annular element, and the annular element is bonded to the disk.

12. A gas turbine engine comprising a blisk, the blisk including a disk and an annular element, the disk disposed about an axis, the disk having an upstream face and a downstream face, the annular element comprising a plurality of blades, each of the blades comprising a platform, an airfoil extending radially outward relative to the axis from the platform, and a shank portion extending between the platform and the disk, the airfoil having a cooling passage defined therein, wherein a cooling cavity is defined in the upstream face of the disk and is in communication with the cooling passage, wherein the platform includes a seal support extending from the airfoil in an upstream direction, wherein the platform and the seal support are formed integrally, wherein a coverplate is coupled to the downstream face of the disk, the coverplate sized to cover the cooling cavity.

13. The gas turbine engine of aspect 12, wherein the platform comprises an axial rim extending in a downstream direction from the airfoil, and a radial flange extending inward from the axial rim, wherein the radial flange is offset in the downstream direction from the disk to define a first circumferential groove, wherein the platform, the axial rim, and the radial flange are formed integrally, wherein an outer edge of the coverplate is sized to be received within the first circumferential groove.

14. The gas turbine engine of any of aspects 12-13, further comprising a support element disposed within the first circumferential groove and in engagement with the coverplate and the radial flange.

15. The gas turbine engine of any of aspects 12-14, wherein a radial lip extends inward from the downstream face of the disk, the radial lip being longitudinally offset in the downstream direction from the disk to define a second circumferential groove, wherein the radial lip is disposed closer to the axis than the radial flange and offset in the upstream direction relative to the radial flange.

16. The gas turbine engine of any of aspects 12-15, wherein the coverplate includes an annular shape having an outer edge and an inner edge, a slot defined by slot defining edges in the coverplate such that the slot defining edges are movable to place the coverplate in an overlapping configuration, and a radial inner tab extending from the inner edge, wherein the radial inner tab is coupled along the radial lip and into the second circumferential groove to securely couple the coverplate to the disk.

17. The gas turbine engine of any of aspects 12-16, wherein the disk and the annular element are formed integrally as a single unit or the annular element is bonded to the disk.

18. A method of manufacturing a blisk for a gas turbine engine, comprising: forming a disk having a first side and a second side; integrally forming an annular element comprising a plurality of blades, each of the blades comprising a platform, an airfoil extending radially outward relative to a longitudinal axis of the engine from the platform, and a shank portion extending radially inward from the platform, the airfoil having a cooling passage defined therein, wherein a cooling cavity is defined underneath the platform and is in communication with the cooling passage, wherein the platform includes a seal support extending out from the airfoil in a direction corresponding to the first side, a rim extending out from the airfoil in a direction corresponding to the second side, and a radial flange extending inward from the rim to define a circumferential groove; and mounting a coverplate within the circumferential groove to cover the cooling cavity.

19. The method of aspect 18, wherein the annular element and the disk are integrally formed as a single casted unit blisk.

20. The method of any of aspects 18-19, wherein the annular element is integrally formed as a single casted unit, the steps further comprising bonding the annular element to the disk to form the blisk.

What is claimed is:

1. A blisk for a gas turbine engine, the blisk comprising:
   a disk disposed about an axis, the disk having an upstream side and a downstream side;
   a plurality of blades, each blade comprising a platform, a cooled airfoil extending radially outward from the platform relative to the axis, and a shank portion extending between the platform and the disk, the disk having a cooling cavity defined therein between the shank portions of the blades that are adjacent to one another, the cooling cavity in fluid communication with the cooled airfoil, wherein a radial lip extends inward relative to the axis from the downstream side of the disk, the cooling cavity configured to receive cooling air provided upstream of the blisk; and
   a coverplate disposed over the cooling cavity, the coverplate including an inner tab extending radially inward from an inner edge of the coverplate, wherein the inner tab is coupled to the radial lip to securely couple the coverplate to the disk.

2. The blisk of claim 1, wherein the coverplate defines an annular shape.

3. The blisk of claim 2, wherein the coverplate is a discontinuous element.

4. The blisk of claim 1, wherein the inner tab engages at least two sides of the radial lip.

5. The blisk of claim 1, wherein the radial lip is longitudinally offset downstream from the disk to define a circumferential groove, and the inner tab includes a tip extending within the circumferential groove.

6. The blisk of claim 5, wherein the inner tab is in a bent configuration.

7. The blisk of claim 1, wherein a radial flange extends inward from the platform, and is longitudinally offset downstream from the shank portion or disk to define a circumferential groove sized to receive an outer edge of the coverplate.

8. The blisk of claim 7, wherein a longitudinal width of the circumferential groove is greater than a longitudinal width of the coverplate.

9. The blisk of claim 8, further comprising a support locking element disposed within the circumferential groove and in engagement with the coverplate and the radial flange.

10. The blisk of claim 1, wherein the disk and the plurality of blades are formed integrally as a single unit.

11. The blisk of claim 1, wherein the plurality of blades are formed integrally as a single unit to define an annular element, and the annular element is bonded to the disk.

12. A gas turbine engine comprising a blisk, the blisk including a disk and an annular element, the disk disposed about an axis, the disk having an upstream face and a downstream face, the annular element comprising a plurality of blades, each of the blades comprising a platform, an airfoil extending radially outward relative to the axis from the platform, and a shank portion extending between the platform and the disk, the airfoil having a cooling passage defined therein, wherein a cooling cavity is defined in the upstream face of the disk and is in communication with the cooling passage, wherein the platform includes a seal support extending from the airfoil in an upstream direction, wherein the platform and the seal support are formed integrally, wherein a coverplate is coupled to the downstream face of the disk, the coverplate sized to cover the cooling cavity.

13. The gas turbine engine of claim 12, wherein the platform comprises an axial rim extending in a downstream direction from the airfoil, and a radial flange extending inward from the axial rim, wherein the radial flange is offset in the downstream direction from the disk to define a first circumferential groove, wherein the platform, the axial rim, and the radial flange are formed integrally, wherein an outer edge of the coverplate is sized to be received within the first circumferential groove.

14. The gas turbine engine of claim 13, further comprising a support element disposed within the first circumferential groove and in engagement with the coverplate and the radial flange.

15. The gas turbine engine of claim 13, wherein a radial lip extends inward from the downstream face of the disk, the radial lip being longitudinally offset in the downstream direction from the disk to define a second circumferential groove, wherein the radial lip is disposed closer to the axis than the radial flange and offset in the upstream direction relative to the radial flange.

16. The gas turbine engine of claim 15, wherein the coverplate includes an annular shape having an outer edge and an inner edge, a slot defined by slot defining edges in the coverplate such that the slot defining edges are movable to place the coverplate in an overlapping configuration, and a radial inner tab extending from the inner edge, wherein the radial inner tab is coupled along the radial lip and into the second circumferential groove to securely couple the coverplate to the disk.

17. The gas turbine engine of claim 13, wherein the disk and the annular element are formed integrally as a single unit or the annular element is bonded to the disk.

18. A method of manufacturing a blisk for a gas turbine engine having a longitudinal axis, comprising:
- forming a disk having a first side and a second side;
- integrally forming an annular element comprising a plurality of blades, each of the blades comprising a platform, an airfoil extending radially outward relative to a longitudinal axis from the platform, and a shank portion extending radially inward from the platform, the airfoil having a cooling passage defined therein, wherein a cooling cavity is defined underneath the platform and is in communication with the cooling passage, wherein the platform includes a seal support extending out from the airfoil in a direction corresponding to the first side, a rim extending out from the airfoil in a direction corresponding to the second side, and a radial flange extending inward from the rim to define a circumferential groove; and
- mounting a coverplate within the circumferential groove to cover the cooling cavity.

19. The method of claim 18, wherein the annular element and the disk formed are integrally formed as a single casted unit blisk.

20. The method of claim 18, wherein the annular element is integrally formed as a single casted unit, the steps further comprising bonding the annular element to the disk to form the blisk.

\* \* \* \* \*